United States Patent
Elwood (10) Patent No.: US 7,447,882 B2
(45) Date of Patent: Nov. 4, 2008

(54) CONTEXT SWITCHING WITHIN A DATA PROCESSING SYSTEM HAVING A BRANCH PREDICTION MECHANISM

(75) Inventor: Matthew Paul Elwood, Austin, TX (US)

(73) Assignee: ARM Limited, Cambridge (GB)

( * ) Notice: Subject to any disclaimer, the term of this patent is extended or adjusted under 35 U.S.C. 154(b) by 196 days.

(21) Appl. No.: 11/109,957

(22) Filed: Apr. 20, 2005

(65) Prior Publication Data
US 2006/0242391 A1    Oct. 26, 2006

(51) Int. Cl.
G06F 9/00 (2006.01)
(52) U.S. Cl. .................................... 712/238
(58) Field of Classification Search .............. 712/217, 712/218, 239, 238, 207, 237
See application file for complete search history.

(56) References Cited

U.S. PATENT DOCUMENTS

| | | | | |
|---|---|---|---|---|
| 5,530,825 A * | 6/1996 | Black et al. ................ | 711/213 |
| 5,875,325 A * | 2/1999 | Talcott .................... | 712/240 |
| 6,088,793 A * | 7/2000 | Liu et al. .................. | 712/239 |
| 6,163,764 A * | 12/2000 | Dulong et al. ............. | 703/26 |
| 6,185,676 B1 * | 2/2001 | Poplingher et al. ......... | 712/239 |
| 6,851,043 B1 * | 2/2005 | Inoue ..................... | 712/217 |
| 7,134,005 B2 * | 11/2006 | Henry et al. .............. | 712/240 |
| 2003/0159019 A1 * | 8/2003 | Oldfield et al. ............ | 712/207 |
| 2004/0003217 A1 * | 1/2004 | Ukai ...................... | 712/239 |

* cited by examiner

*Primary Examiner*—Eddie P Chan
*Assistant Examiner*—Jacob Petranek
(74) *Attorney, Agent, or Firm*—Nixon & Vanderhye P.C.

(57) ABSTRACT

A branch target buffer is provided which maintains its entries across context switches within a virtually addressed system. Branch mispredictions are detected for individual entries within the branch target buffer and those individual entries are invalidated.

17 Claims, 4 Drawing Sheets

CONTEXT SWITCHING WITHIN A DATA PROCESSING SYSTEM HAVING A BRANCH PREDICTION MECHANISM

BACKGROUND OF THE INVENTION

1. Field of the Invention

This invention relates to the field of data processing systems. More particularly, this invention relates to data processing systems having a branch prediction mechanism and which may be subject to context switches.

2. Background

It is known to provide data processing systems with branch prediction mechanisms with a view to increasing the processing performance by correctly predicting branch instruction behaviour and so correctly fetching the appropriate sequence of program instructions before the branch instructions concerned are executed. One known mechanism for branch prediction provides a branch target buffer (BTB) which is operable to store an indication indexed by the fetch address as to whether or not instructions associated with that fetch address contain a taken branch instruction and if so what is the branch target address of that taken branch instruction. In this way, if instructions are being fetched from that address, then a prediction can be made that a branch to the associated branch target address will occur (assuming the behaviour is the same as the last time that branch instruction was encountered) and accordingly instruction fetching can be continued from the branch target address. Branch target buffers have become larger as the resources (e.g. gate count) to dedicate to such mechanisms have become more readily available within integrated circuits. Accordingly, a considerable volume of data concerning the previous branch behaviour of the system can be built up within the branch target buffer and a good level of prediction accuracy achieved. Mechanisms may also be provided dedicated to predicting conditional branches, e.g. a global history buffer (GHB).

Within data processing systems the fetch addresses may be physical addresses uniquely identifying a memory address within physical address space. Alternatively, the system may use virtual addresses to address a memory system with those virtual addresses then being translated into physical addresses within the memory system in order to return the appropriate instructions. The use of virtual memory addressing causes problems for branch target prediction in that when a context switch is made, such that the mapping between virtual addresses and the physical addresses is changed, a virtual address that is subsequently issued to fetch instructions from memory in the new context can incorrectly produce a hit within the branch target buffer relating to a taken branch instruction which was present at that same virtual address in the previous context. If that hit causes a misprediction and an inappropriate branch to be taken in the instruction fetching, then this needs to be identified and repaired.

One known technique for dealing with the problem of context switches within systems including virtual addressing and a branch target buffer is to flush the branch target buffer so as to invalidate all of its entries when a context switch occurs. Another known technique is to add a process identifier to each tag, and compare the current process identifier as part of the tag. However, this increases the storage requirements and the size of the comparator.

It would also be possible to address the branch target buffer with physical addresses. However, this approach has the disadvantage of increasing latency in detaining a branch prediction since the prediction must wait until a translation lookaside buffer lookup has been made.

SUMMARY

Viewed from one aspect the present invention provides apparatus for processing data under control of program instructions of variable length, said apparatus comprising:

a memory operable to store said program instructions;

a fetch unit operable to fetch blocks of program instructions to be added to a sequence of program instructions to be decoded from fetch addresses within said memory; and a branch target buffer operable to store a plurality of entries predicting fetch addresses of respective blocks of program instructions as containing a branch instruction to a branch target address, said branch target buffer being responsive to a fetch address of a block of program instructions being fetched from said memory by said fetch unit to detect a hit for an entry within said branch target buffer predicting that a branch instruction is present within said block of program instructions; wherein said fetch addresses are virtual memory addresses and said apparatus is switchable between a plurality of contexts sharing a common virtual address space such that an entry stored in said branch target buffer indicating a fetch address of a block of program instruction including a branch instruction in one context does not predict whether or not said fetch address corresponds to a block of program instructions containing said branch instruction when said apparatus is switched to a different context; and said branch target buffer entries are maintained across a context switch such that a hit within said branch target buffer following said context switch can be a false hit incorrectly predicting a branch instruction within a fetched block of program instructions and incorrectly resulting in a redirection of program flow; said apparatus further comprising:

a false hit detecting circuit operable subsequent to said false hit incorrectly redirecting program flow to detect a false hit program instruction incorrectly predicted to be a branch instruction by said false hit and to invalidate an entry within said branch target buffer corresponding to said false hit.

The present technique recognizes that a branch target buffer may contain a considerable volume of data concerning the previously encountered branch behaviour and that discarding all of this information upon every context switch can produce worse overall performance than maintaining this data across the context switch and repairing the mispredictions as they occur. As branch target buffer sizes increase, the advantages of maintaining the data relating to the previously observed branch behaviour also increase. Furthermore, in many operational systems, context switches are relatively short term, and the systems tend to spend the majority of their time operating within the same context. Thus, whilst brief context switches may occur during which mispredictions can arise which need to be corrected, the system often relatively quickly returns to the original context and the data within the branch target buffer which has been maintained is then able to be used to advantage again without having to be rebuilt. The branch target buffer may operate together with global or local predictors giving taken or not taken predictions for the entries within the branch target buffer. The branch target buffer may also only store entries for taken branches. This can save branch target buffer storage space. In other embodiments the BTB may contain the taken/not taken directional bits. It is also possible for the BTB to contain the directional prediction information, e.g. history values or tables, obviating the need for external direction predictors, e.g. a GHB. The source of the directional prediction can vary in differing embodiments of the present technique.

The BTB may contain entries only for taken conditional branches and unconditional branches (always taken if not predicated) which trigger redirection of program flow.

The problems of mispredictions by the branch target buffer are increased when the program instructions have a variable length since attempted predictions subsequent to a context switch can result in portions (e.g. halfwords) of variable length instructions being fetched and passed to the system for execution in a manner which results in malformed instructions being presented for decoding and execution. These malformed instructions need to be detected such that inappropriate operation can be prevented and the detection of such instructions can also be used to identify a false hit within the branch target buffer. If the addresses of the highest portions of the fetched and predicted instructions differ then this indicates malformation. The highest portion of the fetched instruction being at a position less than that indicated for the predicted instruction.

A suitable way for detecting mispredictions subsequent to a context switch is to flag taken branch instructions as they are added to the sequence of instructions to be executed. Flagging taken branch instructions, or what the branch target buffer predicts to be taken branch instructions, enables the decoders within the system to examine the instructions including the flags to check that these are consistent with proper instruction formation.

As an example, within a system having multiple instruction sets of different sizes and capable of different word alignments a misprediction associated with a malformed instruction can be identified by identifying a program instruction flagged as a predicted taken branch but having a word alignment not possible for the instruction word size within the current context. A machine supporting a variable length instruction set may switch between two contexts with different sized instructions at the same virtual address, e.g. a 16-bit instruction overlaps the lowest virtual address portion of a 32-bit instruction. A small instruction decoder, limited to determining instruction size, can be used to detect these cases.

One way of repairing the system behaviour is to use a false hit detecting circuit within the instruction fetching portion of the system to re-fetch the block of program instructions which was mispredicted after the entry within the branch target buffer corresponding to the false hit has been invalidated.

Another way of repairing a misprediction is to use a false hit detecting circuit as part of the instruction decoding portion of the system and to flush instructions following a misprediction from the pipeline and jump back to the mispredicted instruction once the entry within the branch target buffer corresponding to the false hit has been invalidated.

A further way of repairing a misprediction locally to the instruction fetch unit is that the false hit detecting circuit detects that the fetch contains a predicted taken branch on a partial instruction using a small instruction decoder operable to determine instruction size. This decoder can be shared with other parts of the overall branch prediction mechanisms. The small instruction decoder can also be used to detect malformed instructions. A system supporting variable length instructions will employ such a small decoder to determine instruction length. The fetch containing the incorrectly predicted branch is loaded into the instruction queue, but the instruction queue will not issue partial instructions if it reaches one. Fetching is stopped when the malformed instruction is detected—the branch target is not fetched and the malformed instruction is the last item in the instruction queue. The instruction queue is allowed to empty up to the point that the partial instruction is all that remains. At this point the instruction queue is flushed and fetching is restarted at the address of the partial instruction. In parallel the branch target buffer entry associated with the incorrectly addressed prediction is invalidated.

Viewed from another aspect the present invention provides a method of processing data under control of program instructions of variable length, said method comprising:

storing said program instructions in a memory;

fetching blocks of program instructions to be added to a sequence of program instructions to be decoded from fetch addresses within said memory; and storing in a branch target buffer a plurality of entries predicting fetch addresses of respective blocks of program instructions as containing a branch instruction to a branch target address, said branch target buffer being responsive to a fetch address of a block of program instructions being fetched from said memory by said fetch unit to detect a hit for an entry within said branch target buffer predicting that a branch instruction is present within said block of program instructions; wherein said fetch addresses are virtual memory addresses and said method of processing data is switchable between a plurality of contexts sharing a common virtual address space such that an entry stored in said branch target buffer indicating a fetch address of a block of program instruction including a branch instruction in one context does not predict whether or not said fetch address corresponds to a block of program instructions containing said branch instruction when said apparatus is switched to a different context; and said branch target buffer entries are maintained across a context switch such that a hit within said branch target buffer following said context switch can be a false hit incorrectly predicting a branch instruction within a fetched block of program instructions and incorrectly resulting in a redirection of program flow; said method further comprising:

subsequent to said false hit incorrectly redirecting program flow, detecting with a false hit detecting circuit a false hit program instruction incorrectly predicted to be a branch instruction by said false hit and to invalidate an entry within said branch target buffer corresponding to said false hit.

Viewed from a further aspect the present invention provides apparatus for processing data under control of program instructions of variable length, said apparatus comprising:

memory means for storing said program instructions;

a fetch unit means for fetching blocks of program instructions to be added to a sequence of program instructions to be decoded from fetch addresses within said memory means; and branch target buffer means for storing a plurality of entries predicting fetch addresses of respective blocks of program instructions as containing a branch instruction to a branch target address, said branch target buffer means being responsive to a fetch address of a block of program instructions being fetched from said memory means by said fetch unit means to detect a hit for an entry within said branch target buffer means predicting that a branch instruction is present within said block of program instructions; wherein said fetch addresses are virtual memory addresses and said apparatus is switchable between a plurality of contexts sharing a common virtual address space such that an entry stored in said branch target buffer means indicating a fetch address of a block of program instruction including a branch instruction in one context does not predict whether or not said fetch address corresponds to a block of program instructions containing said branch instruction when said apparatus is switched to a different context; and said branch target buffer entries are maintained across a context switch such that a hit within said branch target buffer means following said context switch can be a false hit incorrectly predicting a branch instruction within a fetched block of program instructions and incorrectly resulting in a redirection of program flow; said apparatus further comprising:

a false hit detecting circuit means for, subsequent to said false hit incorrectly redirecting program flow, detecting a false hit program instruction incorrectly predicted to be a branch instruction by said false hit and to invalidate an entry within said branch target buffer means corresponding to said false hit.

The above, and other objects, features and advantages will be apparent from the following detailed description of illustrative embodiments which is to be read in connection with the accompanying drawings.

DETAILED DESCRIPTION

Figure 1:
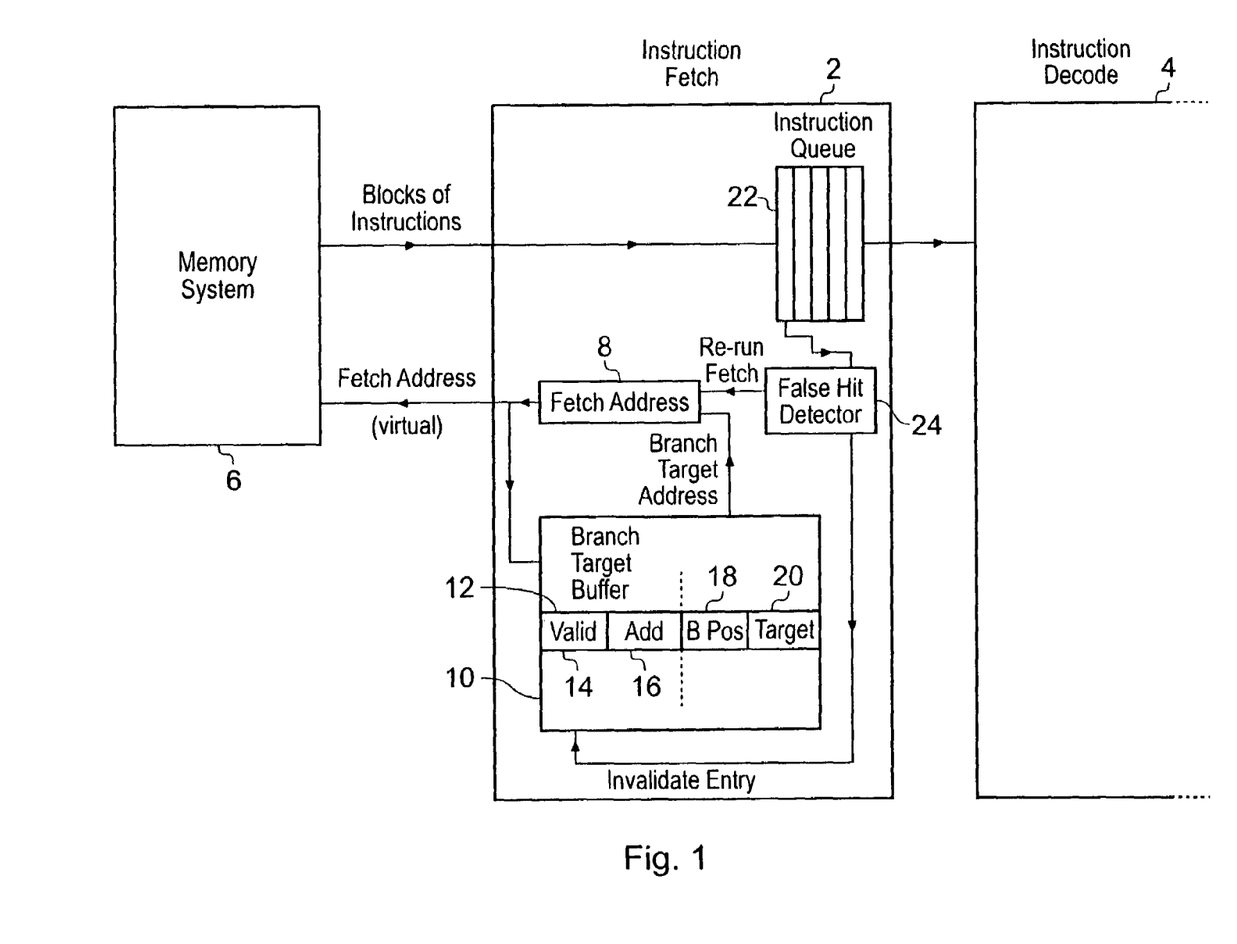
FIG. 1 schematically illustrates a first example embodiment of a portion of a data processing system including a branch target buffer and a mechanism for detecting false hits within that branch target buffer.

FIG. 1 schematically illustrates a part of a data processing system including a pipeline having an instruction fetch portion 2 and an instruction decode portion 4. It will be appreciated that the data processing system will include many other portions as required to execute the program instructions and manage the system operation. The present technique is however illustrated with reference to the instruction fetch portion 2 and the instruction decode portion 4 with which it is, in this example embodiment, particularly concerned.

A memory system 6 stores program instructions to be fetched and executed. This memory system 6 is addressed with a fetch address which is a virtual address. It will be appreciated that within the memory system 6 the virtual address will be translated to a physical address in order to access a particular program instruction. However, from the point of view of the instruction fetch portion 2, the fetch addresses are generated as virtual addresses within virtual memory space. A register 8 stores a fetch address to be issued to fetch a block of program instructions from the memory system 6. The block of program instructions can contain one or several program instructions or part of a program instruction (e.g. 16-bits a of 32-bit instruction). The program instructions may be variable length and so a particular fetched block of program instructions doesn't necessarily contain a fixed number of instructions at fixed alignments. However, the virtual addresses from which a block of program instructions is fetched can be compared with the contents of a branch target buffer 10 to determine if that block has previously been fetched and if when subsequently decoded it was determined that the fetched block of program instructions included a taken branch instruction. Such branch target buffers and their use and maintenance are in themselves known within this technical field. The entries 12 within the branch target buffer 10 each contain a valid bit 14 indicating whether or not that entry is valid, an upper address tag portion 16 which is compared to the fetch address to determine whether or not the entry matches the current fetch address, a branch position field 18 indicating that when a taken branch was previously encountered within that block where the position of the branch was within the block such that program instructions subsequent to that position can be ignored and the following program instructions fetched from the stored branch target address 20 can be arranged to follow from the branch position 18. When a hit occurs within the branch target buffer 10, the branch target address 20 stored for the entry concerned is passed to the register 8 and forms the new fetch address from which the next block of program instructions is to be fetched.

The fetched blocks of program instructions are passed to an instruction queue 22 where they are stored and ordered before being passed onto the instruction decode portion 4 of the instruction pipeline. Within the first stage of the instruction queue 22 (although it could take place in subsequent stages) a false hit detector 24 serves to examine the program instructions which have been returned to determine whether or not predicted taken branch markers (the position field 18 points to the highest addressable portion of a instruction) within the returned block fall at the end of instructions as they should. If not, then this indicates a malformed instruction as will be discussed in relation to FIG. 4. If the false hit detector 24 determines that the returned block of program instructions contains a malformed instruction, then the fetch is allowed to enter the instruction queue and all instructions prior to the malformed fragment will be allowed to be issued to decode. When the instruction queue is empty (assuming that a flush hasn't occurred in the interim) save for the fragment, the instruction queue will be flushed. Thus the false hit detector 24 removes from the sequence of instructions to be decoded the malformed instruction (false hit instruction) and any subsequently added instructions (via the flush). The fetch at the address of the fragment will be re-initiated and the branch target buffer entry with a tag pointing to the bad branch will be invalidated. The branch target buffer entry is invalidated using an invalidate signal which changes the valid bit 14 of that entry. Thus, the false hit detector 24 discards the program instructions within the instruction queue 22 subsequent to the misprediction (possibly after having drained the instruction queue 22 up to the point of the false hit) and triggers a refetch of instructions starting from the beginning of the malformed instruction within the block which resulted in the false hit. Upon this refetch the entry 12 which resulted in the misprediction will now be invalid and so a hit will not occur and the incorrect redirection of program flow will not be triggered. The verification that the instruction which is marked as a predicted taken branch takes place in the decoder portion such as in the way described below in relation to FIG. 2.

Figure 2:
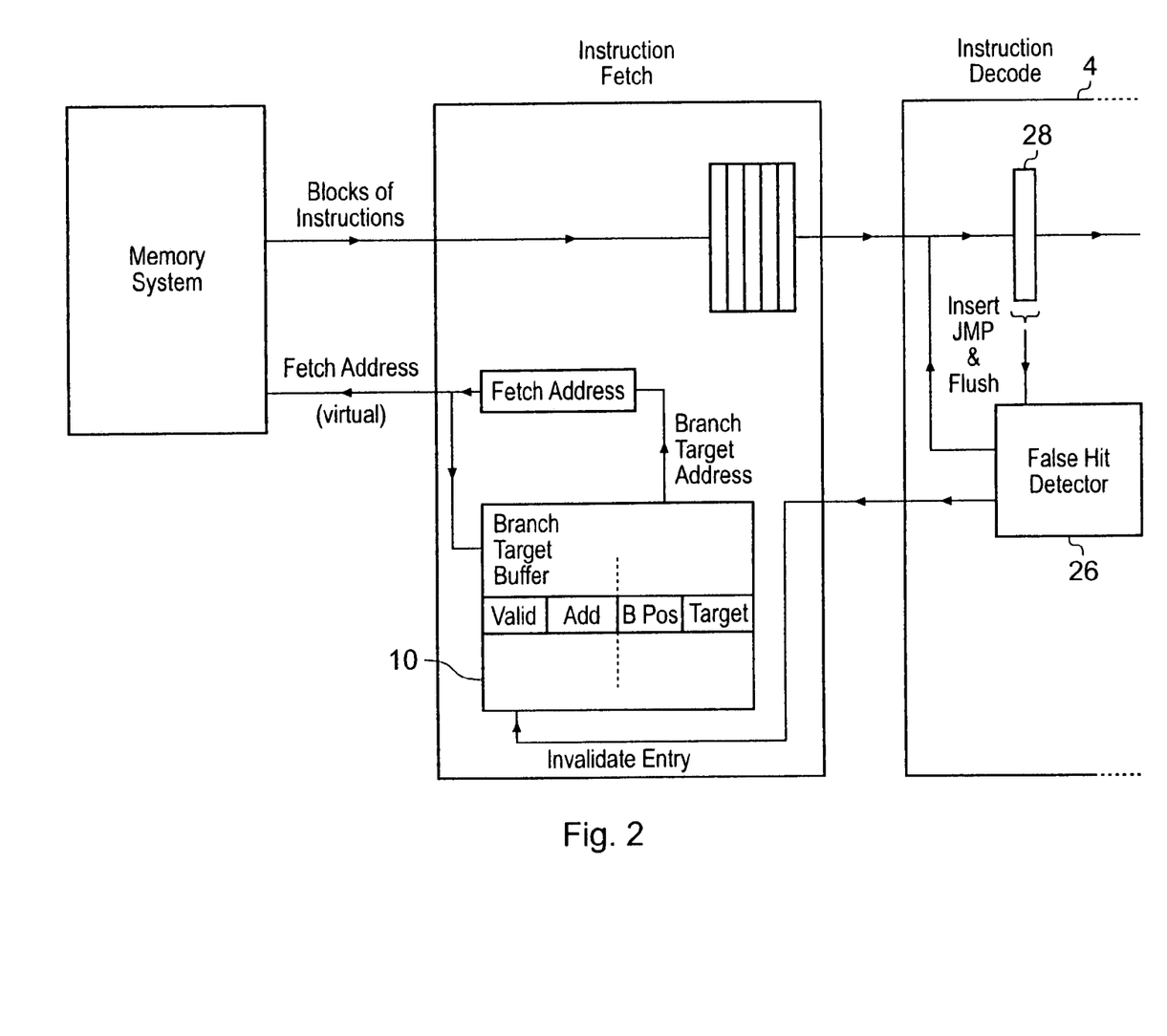
FIG. 2 schematically illustrates a second example embodiment of a portion of a data processing system having a branch target buffer and a mechanism for detecting false hits within that branch target buffer.

FIG. 2 illustrates a second example embodiment. In this example embodiment the false hit detector 26 is located within the instruction decode portion 4 of the instruction pipeline. The false hit detector 26 is responsive to a copy of a program instruction stored within a register 28 being passed along the pipeline for decoding and execution to detect whether or not that program instruction is a taken branch instruction as was previously predicted. When the branch target buffer 10 predicts a taken branch instruction, the program instruction so predicted can be flagged as a predicted taken branch instruction (with a PT flag) and this flag passed with that program instruction along the instruction pipeline. Thus, the false hit detector 26 can examine flagged instructions indicated to be predicted taken branch instructions to determine that they properly conform to the characteristics of taken branch instructions. The determination by the false hit detector 26 may be made by at least partially decoding the program instruction to determine if it is a branch instruction. In order to deal with misaligned/malformed instructions, a variation of the instruction fetch portion of FIG. 1 can be used in combination with the decode portion of FIG. 2. The fetch portion detects a misaligned instruction and sends a flag to the decode portion to ignore this instruction. The decode portion then passes back an invalidate and refetch indication to invalidate the branch target buffer entry, fetch a new block and flush the false hit.

It is also possible that a fetched block of instructions may contain multiple flags. In a system where multiple taken branches per fetched are possible, only the first taken branch matters. For each instruction, the fetch portion sends N predicted taken indicators for an instruction of N portions (in this example halfwords, so a 16-bit instruction would send one indicator, a 32-bit would send two). The decode unit then detects the malformed instruction by decoding the instruction, determining that it was 32-bits in size, and receiving a predicted taken indicator on halfword one. False hits when the instruction is complete, but not a predictable branch, are detected in the decode portion. The decode portion sends a "not-a-branch" indicator to the execute portion. The execute portion sends the indicator back to fetch portion in a manner similar to normal proper mispredicted branches. If such a misprediction is detected by the false hit detector 26, then the repair mechanism used is to flush the pipeline upstream of the detection since this will contain instructions fetched from the wrong place as a consequence of the mispredicted branch, to invalidate of the appropriate entry within the branch target buffer 10 and to insert and execute a jump instruction redirecting program flow to the point at which the misprediction was made such that fetching can be resumed from this point but this time without the now invalidated entry within the branch target buffer causing a misprediction.

Figure 3:
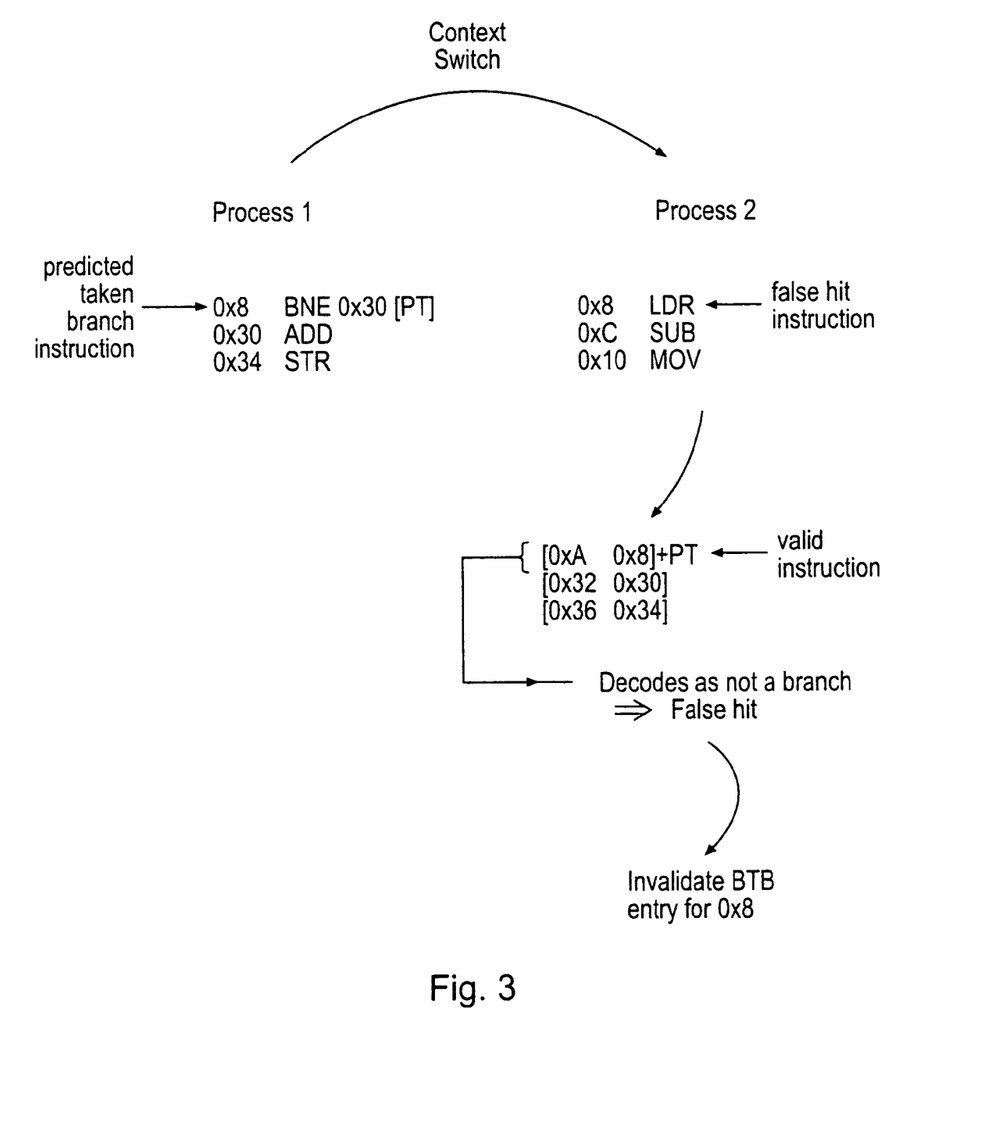
FIG. 3 illustrates a first scenario in which a branch misprediction can occur on a context switch and the way in which that may be detected.

FIG. 3 illustrates a first example scenario in which a misprediction can occur subsequent to a context switch and how this may be detected. As illustrated, Process 1 contains a predicted taken branch instruction at address 0×8. This predicted taken branch instruction has a branch target address of 0×30. When this taken branch instruction is first encountered, it is not predicted. Subsequently, when the taken branch is identified later in the pipeline, an entry is made within the branch target buffer 10 corresponding to the fetched block of program instructions containing the taken branch instruction such that when that block of program instructions is next fetched it can be identified as containing a predicted taken branch instruction and the location of that branch instruction within the block identified together with the branch target address.

When a context switch occurs to move the system to execute a second Process 2, the virtual to physical address mapping will change. Thus, entries within the branch target buffer 10 relating to the virtual addresses identified as containing predicted taken branch instructions during execution of Process 1 will no longer be appropriate and properly predict the behaviour within the new Process 2. In this example, when the block of program instructions containing virtual address 0×8 is fetched it will produce a hit within the branch target buffer 10 as a consequence of the previous behaviour observed during execution of Process 1, i.e. a false hit will arise for a false hit instruction LDR which is not a predictable branch instruction. The LDR instruction itself will be fetched and is a valid instruction which can be executed, but the instructions following that LDR will not be correct since program flow will have been inappropriately redirected to the branch target address 0×30 as a consequence of the false hit rather than continuing the instruction at virtual address 0×C, namely the SUB instruction.

The false hit instruction LDR can be identified/decoded as not being a branch instruction subsequent to the fetching and misprediction and accordingly the occurrence of a false hit can be identified. The false hit instruction is itself valid and accordingly will be executed, but the subsequent instructions can be flushed and the entry within the branch target buffer 10 for virtual address 0×8 can be invalidated. The fetch can then be rerun or a jump can be made to the address 0×C.

Figure 4:
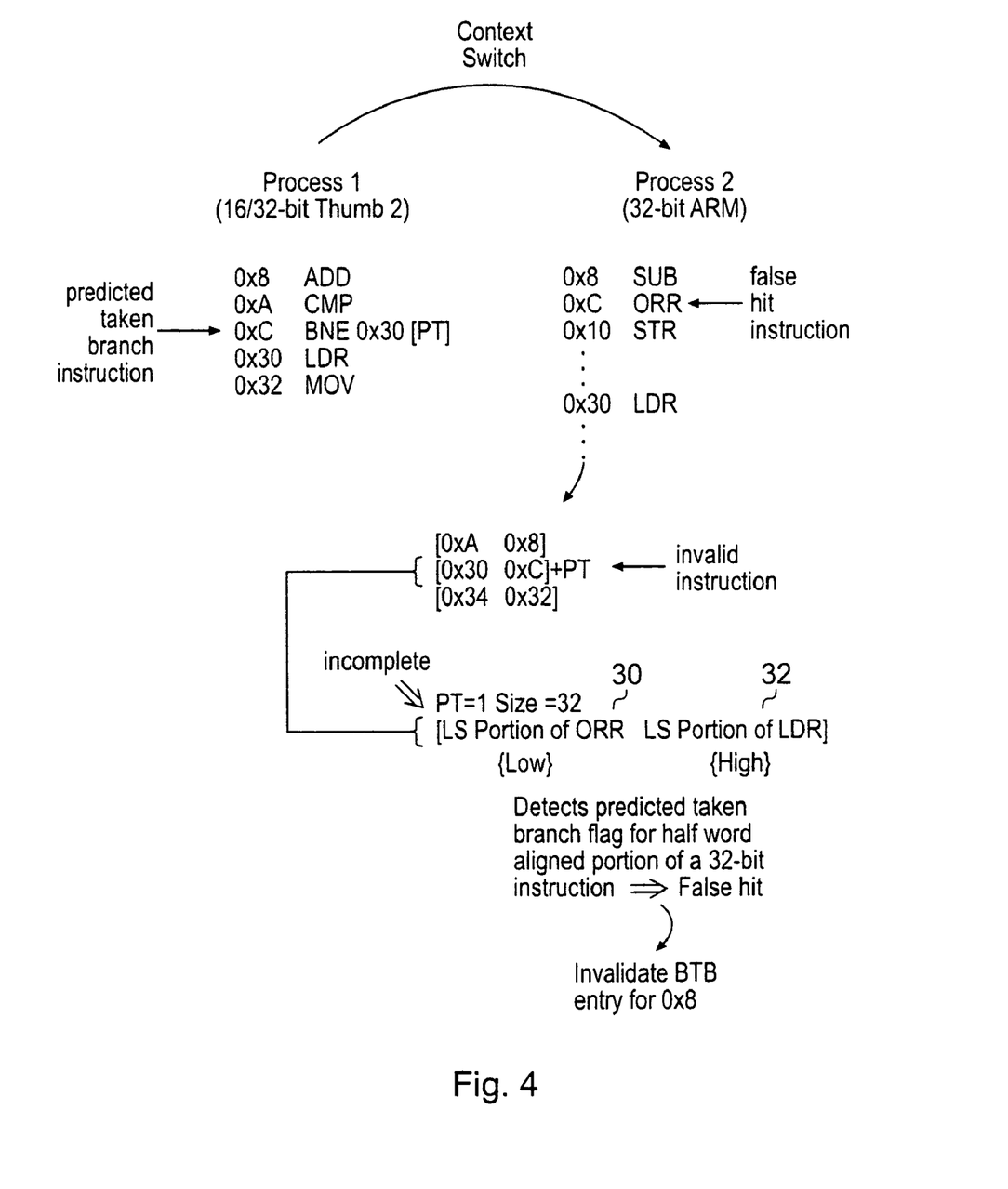
FIG. 4 illustrates a second scenario in which a branch misprediction can occur on a context switch and the way in which that may be detected.

FIG. 4 illustrates a second example scenario of a misprediction. In this example the first process Process 1 includes variable length instructions which can be 16-bit instructions or 32-bit instructions. The second process Process 2, in this example, contains fixed length 32-bit program instructions (the second process need not only contain 32-bit instructions, it could be mixed 16-bit and 32-bit instructions with string of 32-bit instructions at the relevant alignments—the false hit detector serves to decode the length of the incoming instructions—the length of the instruction in the mixed 16 and 32-bit instruction set can be determined from the first (lowest fetch address) portion due to the encodings used). The predicted taken branch instruction, in this case BNE, is a 16-bit instruction stored at virtual address 0×C. This predicted taken branch instruction has a branch target address of 0×30.

Subsequent to the context switch to Process 2, the ORR instruction at virtual address 0×C is incorrectly identified as a predicted taken branch instruction and is a false hit instruction. Since the predicted taken branch instruction BNE was a 16-bit instruction and this was indicated by the branch position field 18 within the entry within the branch target buffer 10 for that predicted taken branch instruction, then the program instructions subsequent to that predicted taken branch instruction would have been fetched on the assumption that the predicted taken branch instruction was of length 16-bits. Accordingly, a misformed instruction will effectively be fetched when the misprediction occurs in Process 2, namely the least significant 16-bit portion of the ORR instruction 30 will be fetched and this will be concatenated with a least significant portion 32 of the LDR instruction located at the mispredicted branch target address 0×30 The first portion 30 of the misformed instruction will be flagged as a predicted taken branch instruction with the PT flag being set as indicated. This portion will have a half word alignment compared to the full 32-bit word alignment which is appropriate for the current 32-bit mode of Process 2. The instructions being passed along the pipeline are flagged as having a size of 32-bits and accordingly the presence of the misformed instruction can be detected through the invalid combination of the size being indicated to be 32-bits with a predicted taken branch instruction being indicated to have its highest order portion at a half word alignment since this combination cannot validly occur within the operating mode of Process 2. As a consequence of this identified misprediction, the incorrectly fetched program instructions can be flushed from the system and the entry 12 within the branch target buffer 10 which led to the misprediction can be invalidated. Alternatively, if alignment is checked, the occurrence of a PT flag on the first half of a 32-bit instruction, independent of alignment, signals a malformed instruction. Such misaligned/malformed instructions are detected with both the FIG. 1 and FIG. 2 embodiments.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data under control of program instructions of variable length, said apparatus comprising:
a memory configured to store said program instructions;
a fetch unit configured to fetch blocks of program instructions to be added to a sequence of program instructions to be decoded from fetch addresses within said memory; and
a branch target buffer configured to store a plurality of entries predicting fetch addresses of respective blocks of program instructions as containing a branch instruction to a branch target address, said branch target buffer being responsive to a fetch address of a block of program instructions being fetched from said memory by said fetch unit to detect a hit for an entry within said branch target buffer predicting that a branch instruction is present within said block of program instructions; wherein
said fetch addresses are virtual memory addresses and said apparatus is switchable between a plurality of contexts sharing a common virtual address space such that an entry stored in said branch target buffer indicating a fetch address of a block of program instruction including a branch instruction in one context does not predict whether or not said fetch address corresponds to a block of program instructions containing said branch instruction when said apparatus is switched to a different context; and
said branch target buffer entries are maintained across a context switch such that a hit within said branch target buffer following said context switch can be a false hit incorrectly predicting a branch instruction within a fetched block of program instructions and incorrectly resulting in a redirection of program flow; said apparatus further comprising:
a false hit detecting circuit configured subsequent to said false hit incorrectly redirecting program flow to detect a false hit program instruction incorrectly predicted to be a taken branch instruction by said false hit and to invalidate an entry within said branch target buffer corresponding to said false hit while other entries in said branch target buffer are not invalidated,
wherein said block of program instructions includes a plurality of instructions, said program instructions having a highest virtual address portion and when said branch instruction corresponding to said hit prior to said context switch is stored with a highest virtual address portion different to a highest virtual address portion of said false hit program instruction then said redirection of program flow for said false hit results in an incomplete part of said false hit program instruction being added to said sequence, and
wherein said false hit detecting circuit is part of said fetch unit and said false hit detecting circuit is configured to remove from said sequence any portion of said false hit program instruction and any subsequent program instructions added to said sequence after said false hit and to re-fetch said block of program instruction from said memory after said entry within said branch target buffer corresponding to said false hit has been invalidated.

2. Apparatus as claimed in claim 1, wherein said plurality of entries predict fetch addresses of respective blocks of program instructions as containing a taken branch, a hit with said branch target buffer triggering redirection of program flow such that a program instruction stored in said memory at said branch target address for said entry corresponding to said hit follows said taken branch instruction in said sequence.

3. Apparatus as claimed in claim 1, wherein said false hit detecting circuit is configured to detect said incomplete part of said false hit program instruction.

4. Apparatus as claimed in claim 1, wherein a program instruction predicted to be a taken branch instruction is added to said sequence is flagged within said sequence as a predicted taken branch instruction.

5. Apparatus as claimed in claim 4, wherein a first instruction set of program instructions is used before said context switch and a second instruction set of program instructions is used after said instruction set.

6. Apparatus as claimed in claim 5, wherein said first instruction set includes taken branch instructions that are smaller than any taken branch instructions within said second instruction set such that when operating subsequent to said context switch any program instruction within said sequence flagged as a predicted taken branch instruction and having a memory word alignment not possible with predicted taken branch instructions of said second set of program instructions is detected as said incomplete part of said false hit program instruction.

7. Apparatus as claimed in claim 6, wherein said second set of program instructions comprises all 32-bit program instructions which are 32-bit word aligned within said virtual memory space and said first set of program instructions includes 16-bit taken branch instruction that are 16-bit half word aligned within said virtual memory space.

8. Apparatus as claimed in claim 1, wherein said false hit detecting circuit is part of an instruction decoding portion of said apparatus and said false hit detecting circuit is configured to flush from an instruction pipeline of said apparatus any portion of said false hit program instruction and any subsequent program instructions within said instruction pipeline and to insert a program instruction jumping to a program instruction stored at a virtual memory address corresponding to said false hit program instruction after said entry within said branch target buffer corresponding to said false hit has been invalidated.

9. A method of processing data under control of program instructions of variable length, said method comprising:
storing said program instructions in a memory;
fetching blocks of program instructions to be added to a sequence of program instructions to be decoded from fetch addresses within said memory; and
storing in a branch target buffer a plurality of entries predicting fetch addresses of respective blocks of program instructions as containing a branch instruction to a branch target address, said branch target buffer being responsive to a fetch address of a block of program instructions being fetched from said memory by said fetch unit to detect a hit for an entry within said branch target buffer predicting that a branch instruction is present within said block of program instructions; wherein
said fetch addresses are virtual memory addresses and said method of processing data is switchable between a plurality of contexts sharing a common virtual address space such that an entry stored in said branch target buffer indicating a fetch address of a block of program instruction including a branch instruction in one context does not predict whether or not said fetch address corresponds to a block of program instructions containing said branch instruction when said apparatus is switched to a different context; and said branch target buffer entries are maintained across a context switch such that a hit within said branch target buffer following said context switch can be a false hit incorrectly predicting a branch instruction within a fetched block of program instructions and incorrectly resulting in a redirection of program flow; said method further comprising:

subsequent to said false hit incorrectly redirecting program flow, detecting with a false hit detecting circuit a false hit program instruction incorrectly predicted to be a branch instruction by said false hit and to invalidate an entry within said branch target buffer corresponding to said false hit while other entries in said branch target buffer are not invalidated, wherein said block of program instructions includes a plurality of instructions, said program instructions having a highest virtual address portion and when said branch instruction corresponding to said hit prior to said context switch is stored with a highest virtual address portion different to a highest virtual address portion of said false hit program instruction then said redirection of program flow for said false hit results in an incomplete part of said false hit program instruction being added to said sequence, and wherein said false hit detecting circuit is part of an instruction fetching portion and said false hit detecting circuit removes from said sequence any portion of said false hit program instruction and any subsequent program instructions added to said sequence after said false hit and to re-fetch said block of program instruction from said memory after said entry within said branch target buffer corresponding to said false hit has been invalidated.

10. A method as claimed in claim 9, wherein said plurality of entries predict fetch addresses of respective blocks of program instructions as containing a taken branch, a hit with said branch target buffer triggering redirection of program flow such that a program instruction stored in said memory at said branch target address for said entry corresponding to said hit follows said taken branch instruction in said sequence.

11. A method as claimed in claim 9, wherein said false hit detecting circuit detects said incomplete part of said false hit program instruction.

12. A method as claimed in claim 9, wherein a program instruction predicted to be a taken branch instruction is added to said sequence is flagged within said sequence as a predicted taken branch instruction.

13. A method as claimed in claim 12, wherein a first instruction set of program instructions is used before said context switch and a second instruction set of program instructions is used after said instruction set.

14. A method as claimed in claim 13, wherein said first instruction set includes taken branch instructions that are smaller than any taken branch instructions within said second instruction set such that when operating subsequent to said context switch any program instruction within said sequence flagged as a predicted taken branch instruction and having a memory word alignment not possible with predicted taken branch instructions of said second set of program instructions is detected as said incomplete part of said false hit program instruction.

15. A method as claimed in claim 14, wherein said second set of program instructions comprises all 32-bit program instructions which are 32-bit word aligned within said virtual memory space and said first set of program instructions includes 16-bit taken branch instruction that are 16-bit half word aligned within said virtual memory space.

16. A method as claimed in claim 9, wherein said false hit detecting circuit is part of an instruction decoding portion and said false hit detecting circuit flushes from an instruction pipeline any portion of said false hit program instruction and any subsequent program instructions within said instruction pipeline and to insert a program instruction jumping to a program instruction stored at a virtual memory address corresponding to said false hit program instruction after said entry within said branch target buffer corresponding to said false hit has been invalidated.

17. Apparatus for processing data under control of program instructions of variable length, said apparatus comprising:
    memory means for storing said program instructions;
    a fetch unit means for fetching blocks of program instructions to be added to a sequence of program instructions to be decoded from fetch addresses within said memory means; and
    branch target buffer means for storing a plurality of entries predicting fetch addresses of respective blocks of program instructions as containing a branch instruction to a branch target address, said branch target buffer means being responsive to a fetch address of a block of program instructions being fetched from said memory means by said fetch unit means to detect a hit for an entry within said branch target buffer means predicting that a branch instruction is present within said block of program instructions; wherein
    said fetch addresses are virtual memory addresses and said apparatus is switchable between a plurality of contexts sharing a common virtual address space such that an entry stored in said branch target buffer means indicating a fetch address of a block of program instruction including a branch instruction in one context does not predict whether or not said fetch address corresponds to a block of program instructions containing said branch instruction when said apparatus is switched to a different context; and
    said branch target buffer entries are maintained across a context switch such that a hit within said branch target buffer means following said context switch can be a false hit incorrectly predicting a branch instruction within a fetched block of program instructions and incorrectly resulting in a redirection of program flow; said apparatus further comprising:
    a false hit detecting circuit means for, subsequent to said false hit incorrectly redirecting program flow, detecting a false hit program instruction incorrectly predicted to be a branch instruction by said false hit and to invalidate an entry within said branch target buffer means corresponding to said false hit while other entries in said branch target buffer are not invalidated,
    wherein said block of program instructions includes a plurality of instructions, said program instructions having a highest virtual address portion and when said branch instruction corresponding to said hit prior to said context switch is stored with a highest virtual address portion different to a highest virtual address portion of said false hit program instruction then said redirection of program flow for said false hit results in an incomplete part of said false hit program instruction being added to said sequence, and wherein said false hit detecting circuit means is part of said fetch unit means and said false hit detecting circuit means is configured to remove from said sequence any portion of said false hit program instruction and any subsequent program instructions added to said sequence after said false hit and to re-fetch said block of program instruction from said memory after said entry within said branch target buffer corresponding to said false hit has been invalidated.

* * * * *